(12) United States Patent
Rogers et al.

(10) Patent No.: US 6,905,658 B2
(45) Date of Patent: Jun. 14, 2005

(54) CHANNELIZED SCR INLET FOR IMPROVED AMMONIA INJECTION AND EFFICIENT $NO_X$ CONTROL

(75) Inventors: Kevin J. Rogers, Wadsworth, OH (US); Michael G. Varner, North Canton, OH (US); Kenneth F. Hoover, Mogadore, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 565 days.

(21) Appl. No.: 09/896,169

(22) Filed: Jun. 29, 2001

(65) Prior Publication Data

US 2003/0003029 A1 Jan. 2, 2003

(51) Int. Cl.[7] .............................................. B01D 53/34
(52) U.S. Cl. ...................... 422/172; 422/176; 422/177; 422/105
(58) Field of Search ........................ 422/168, 105–116, 422/172, 176, 177

(56) References Cited

U.S. PATENT DOCUMENTS

| | | | | |
|---|---|---|---|---|
| 3,880,597 A | * | 4/1975 | Goldschmidt et al. | 422/176 |
| 4,950,473 A | | 8/1990 | Flockenhaus et al. | |
| 5,435,972 A | * | 7/1995 | Daw et al. | 422/108 |
| 5,437,851 A | | 8/1995 | MacInnis | |
| 5,529,093 A | * | 6/1996 | Gallagher et al. | 138/44 |
| 5,540,897 A | * | 7/1996 | Chu et al. | 422/177 |
| 5,618,499 A | | 4/1997 | Lewis et al. | |
| 5,762,107 A | | 6/1998 | Laws | |
| 6,074,619 A | * | 6/2000 | Schoubye | 423/239.1 |

OTHER PUBLICATIONS

Tonn et al., "2200 MW SCR Installation on New Coal–Fired Project", Institute of Clean Air Companies (ICAC) Forum '98, Marc 18–20, 1998, Durham, NC. p. 2–4.*

*Steam*, Its Generation and Use, 40th Edition, The Babcock & Wilcox Company, ©1992, p. 34–4 to 34–8.

Rogers et al., "Perspectives on Ammonia Injection and Gaseous Static Mixing in SCR Retrofit Applications," EPRI– DOE–EPA Combined Utility Air Pollutant Control Symposium, Aug. 16–20, 1999, Atlanta, GA, p. 1–4.

Signer, "Mixing and Flow Conditioning in Front of a Catalyst Bed for a SCR Process," 2001 Conference on Selective Catalytic Reduction (SCR) and Selective Non–Catalytic Reduction (SNCR) for NOx Control, May 16–18, 2001, Pittsburgh, PA.

Tonn et al., "2200 MW SCR Installation on New Coal–Fired Project," Institute of Clean Air Companies (ICAC) Forum '98, Mar. 18–20, 1998, Durham, NC, p. 2–4.

MacLaughlin et al. , "Selective Catalytic Reduction (SCR) Retrofit at San Diego Gas & Electric Company South Bay Generating Station," EPRI–DOE–EPA Combined Utility Air Pollutant Control Symposium, Aug. 25–29, 1997, Washington, D.C., p. 3–4.

* cited by examiner

*Primary Examiner*—Kiley S. Stoner
*Assistant Examiner*—Kevin McHenry
(74) *Attorney, Agent, or Firm*—Kathryn W. Grant; Michael J. Seymour; Eric Marich

(57) ABSTRACT

A device for channeling boiler flue gas flow and injecting controlled amounts of ammonia upstream of a selective catalytic reduction (SCR) $NO_x$ removal system. A perforated plate and/or damper can be located within one or more channels to provide volumetric control through a channel. Flow conditioning devices such as static mixing tabs and/or flow straightening tube bundles can optionally be included in each channel to improve mixing and velocity profiles. Gas flow rate measurements made, for example via pressure taps, within one or more channels can be used to measure flow and provide feedback for improved ammonia-to-$NO_x$ mole ratio control.

17 Claims, 1 Drawing Sheet

CHANNELIZED SCR INLET FOR IMPROVED AMMONIA INJECTION AND EFFICIENT $NO_x$ CONTROL

FIELD AND BACKGROUND OF INVENTION

The present invention relates generally to the field of industrial and utility boilers and furnaces and in particular to a new and useful channelized inlet for a selective catalytic reduction (SCR) system for control of $NO_x$ emission leaving the system.

SCR systems are used to clean impurities from the exhaust gases of boiler and furnaces, and in particular, to reduce $NO_x$ emissions. Ammonia is injected into the boiler exhaust gas stream in the presence of a catalyst. A chemical reaction occurs with the exhaust gas, which removes a large portion of $NO_x$ from the exhaust gas and converts it to water and elemental nitrogen.

As the catalysts used in SCR systems are carefully engineered and expensive, it is beneficial to be able to control the stoichiometry of the exhaust gas/ammonia/catalyst reaction. Ammonia is typically introduced using sparger tubes to spray ammonia into the exhaust gas stream. The sparger tubes form an ammonia injection grid (AIG).

SCR performance can be significantly affected by non-uniform flue gas flow into the catalyst, and catalyst manufacturers thus typically specify a maximum allowable non-uniformity of the flue gas velocity at the inlet of the SCR. The complex geometry of the flue gas duct upstream of the SCR, the presence of the ammonia injection grid, limited space in retro-fit applications and other factors all contribute to non-uniform gas flow within the duct. Flow correction devices such as perforated plates, splitter plates, turning vanes, hollow tube bundles, rectifier grids and other flow straighteners have all been used to produce a more uniform flue gas velocity profile and straighten the flue gas flow, thereby conditioning the flue gas flow pattern.

SCR systems are currently designed and operated to provide the highest level of flow, temperature and chemical uniformity. Techniques such as zonal AIG injection, static mixing, and judicious use of flow correction devices to provide flow conditioning, have all been used in known SCR designs to attempt to provide the most uniform flow and chemical composition practical. The goal of these designs is to produce a uniform flue gas velocity and a uniform ammonia-to-$NO_x$ ($NH_3/NO_x$) mole ratio at the inlet to the SCR. A uniform $NH_3/NO_x$ mole ratio at the SCR inlet promotes efficient use of both ammonia and catalyst, while minimizing unreacted ammonia. Unreacted ammonia, referred to as ammonia slip, is undesirable as it can result in air heater fouling or baghouse blinding, and may effect the disposal or marketability of fly ash or scrubber byproducts. Maldistribution of the $NH_3/NO_x$ profile at the SCR inlet is usually the major cause of high ammonia slip.

Generally, the $NH_3/NO_x$ mole ratio of the $NH_3$ needed to remove $NO_x$ is represented by the following equation:

$$M_d = \eta + S_{NH3}/NO_x, \text{inlet}$$

where $M_d$=design mole ratio
$\eta$=$NO_x$ removal efficiency
$S_{NH3}$=ammonia slip, in ppm
$NO_x$, inlet=inlet $NO_x$, in ppm Thus at a low removal efficiency, e.g. $\eta$=60%, an $NH_3/NO_x$ imbalance is not a significant problem. However, so-called "high performance" SCR systems are operated much closer to theoretical stoichiometry, to achieve 90%+ removal efficiency, and are thus much less tolerant of $NH_3/NO_x$ mole ratio maldistribution.

Known techniques still have not eliminated the problems of $NH_3/NO_x$ mole ratio maldistribution, particularly for retrofit applications where space and/or pressure drop constraints may limit design options, and for the more demanding requirements of high removal efficiency. Thus improvements that would more precisely control the $NH_3/NO_x$ ratio at the inlet of an SCR would be welcomed by industry.

SUMMARY OF THE INVENTION

One aspect of the present invention is to provide a new system for improving overall SCR $NO_x$ removal efficiency.

Another aspect of the present invention is to provide a new system for minimizing ammonia consumption in an SCR.

A further aspect of the present invention is to provide a new system for improving mixing of ammonia and flue gas upstream of an SCR.

Yet another aspect of the present invention is to provide a new system to minimize average and local peak ammonia slip through an SCR.

Accordingly, a flue for a flowing gas having improved flow characteristics for use with an SCR is provided comprising vanes, located within the flue upstream of a selective catalytic reduction reactor, that divide the flowing gas into two or more separate flow channels, and means for providing ammonia into the gas within each channel.

In an alternate embodiment, a flue for a flowing gas having improved flow characteristics for use with an SCR is provided comprising vanes, located within the flue upstream of a selective catalytic reduction reactor, that divide the flowing gas into two or more separate flow channels, means for providing ammonia within each channel, and conditioning means within each flow channel for conditioning the gas flow pattern.

In yet another embodiment, a flue for a flowing gas having improved flow characteristics for use with an SCR is provided comprising vanes, located within the flue upstream of a selective catalytic reduction reactor, that divide the flowing gas into two or more separate flow channels, means for providing ammonia within each channel, conditioning means within each flow channel for conditioning the gas flow pattern, and gas flow rate measuring means within at least one flow channel for measuring the gas flow rate through the at least one channel, and means for controlling the gas flow rate through the at least one flow channel.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

Figure 1:
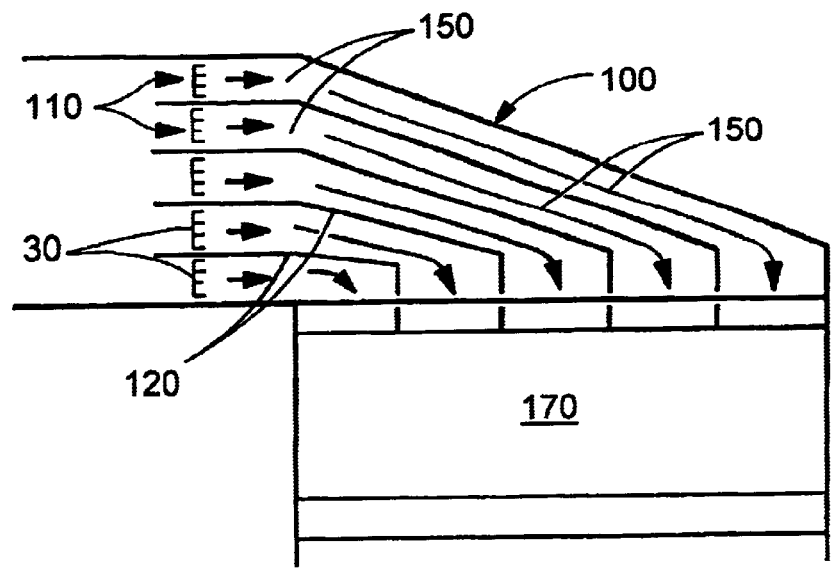
FIG. 1 is a sectional side elevation schematic view of a flue upstream of an SCR having a channelized flow paths according to the invention.

Referring now to the drawings, in which like reference numerals are used to refer to the same or similar elements, FIG. 1 shows flow channels 110 formed inside flue 100 by a series of vanes 120, which segment and direct the flue gas flow 150 toward SCR reactor catalyst bed 170 along discrete flow paths. Within each flow channel 110, an ammonia supply system 30 injects ammonia into the flue gas. The ammonia reacts with the $NO_x$ in the flue gas as it travels through the SCR reactor catalyst bed 170. The vanes 120 thus serve to isolate the ammonia injected into each channel until it arrives at, or is just upstream of, the SCR reactor catalyst bed 170. This allows one to know with a high degree of certainty that the ammonia injected into each flow channel will be directed to a specific location across the cross-section of the SCR reactor catalyst bed 170. This provides for more precise control of the ammonia-to-$NO_x$ mole ratio distribution at the inlet of the SCR reactor catalyst bed 170 and significantly facilitates reactor adjustment, thereby improving $NO_x$ removal efficiency.

By providing individual flow channels 110, more precise reactor control is possible. The greater the number of flow channels 110, or the longer the channels extend, the greater the control precision. Shorter channel segments are also effective for use in the environment of the SCR system.

The amount of mixing in a flow channel increases with the distance the fluid travels along the flow channel. Mixing processes thus rely on the availability of some downstream length to accomplish a certain degree of mixing. The degree of mixing can be plotted as a function of downstream length in units of the number of hydraulic diameters. Providing individual flow channels 110, each having a smaller hydraulic diameter than the flue 100 as a whole, therefore shortens the mixing distance needed to achieve the same degree of mixing as compared to a single flow path spanning the entire flue 100. Each individual flow channel conditions the flue gas more efficiently in terms of the distance traveled and/or pressure drop experienced.

Gas resistance or pressure drop provided by the SCR bed 170 has a flow redistribution effect that improves gas flow uniformity as the flue gas approaches the face of SCR bed 170. Terminating the channels in close proximity to the face of SCR bed 170, or sealing the multiple flow channels 110 directly to the face of SCR bed 170, minimizes or eliminates fluid interaction among the various streams as they leave the flow channels. Thus some or all of the flow corrective capability of SCR bed 170 gas flow resistance can be propagated forward to the entrance of the multiple flow channels 110. Under these conditions, the flow corrective capability of the gas flow resistance of SCR bed 170 therefore improves the overall gas flow uniformity prior to ammonia injection 30, where it is known to be useful in establishing more uniform dosing of ammonia into the gas stream.

Figure 2:
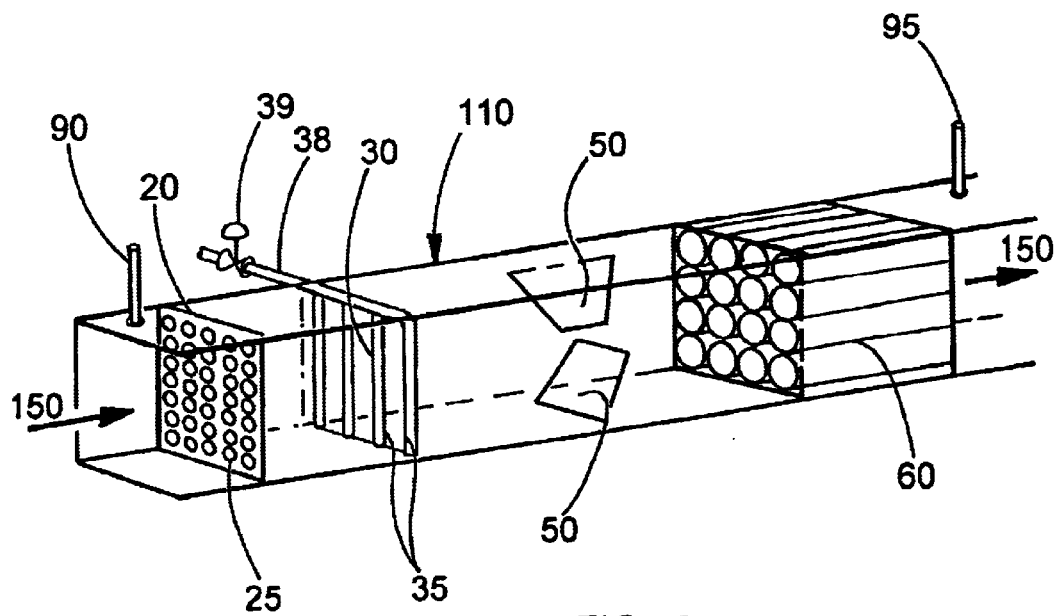
FIG. 2 is a perspective view of a single, channelized flow path upstream of an SCR according to the invention.

FIG. 2 shows a single channelized flow path 110 having an optional plate 20 with multiple perforations 25 at the channel inlet. Plate 20 can be used to provide volumetric control of flue gas flow rate through the channelized flow path 110. When used, plate 20 also acts to condition the flue gas flow pattern within the channel by creating a more uniform flue gas velocity profile across the channel, thus helping to improve the uniformity with which ammonia is injected into the flue gas flow. The plate 20 may include flow straighteners extending from around each of the perforations (not shown) to further condition the flue gas flow pattern, and dampers (also not shown) for variably controlling the flow through the plate 20. The plate 20 may be located recessed from the immediate entrance to the channel 110 as shown, or it can be placed flush with the entrance to the channel 110.

An ammonia supply system 30 having a supply pipe 38, such as an ammonia injection grid (AIG) having sparger pipes 35, is positioned downstream of the plate 20. The ammonia supply system 30 provides ammonia to the flue gas, and the ammonia reacts with the $NO_x$ in the flue gas as it travels through the SCR reactor catalyst bed 170 shown in FIG. 1. Referring again to FIG. 2, a control valve 39 in supply pipe 38 can be used to variably adjust the flow rate of the ammonia into the channel 110.

Following the ammonia supply system 30, optional static mixing devices 50, such as static mixing tabs, can be used to improve mixing within the channel. Flow straightening tube bundle 60 may be positioned at the end of channel 110 for additional flow straightening or in place of the static mixing tabs 50. Alternatively, both the static mixing tabs 50 and tube bundle 60 may be omitted from the channel 110. In such a case, plate 20 with perforations 25 can be used alone to control and condition the flue gas flow through the channel 110.

Means such as pressure taps 90 and 95, located at the inlet and outlet ends respectively of channel 110, can be used to measure or indicate the flue gas flow rate, for ammonia supply feed control feedback and to evaluate $NO_x$ control.

Where the catalyst bed properties contribute to different pressure drops across the SCR reactor catalyst bed 170, the flow channels 110 can be adjusted to also have non-uniform pressure drops to correct the overall pressure drop profile in order to facilitate a more uniform flow profile across the SCR reactor catalyst bed 170.

While specific embodiments of the invention have been shown and described in detail to illustrate the application of the principles of the invention, those skilled in the art will appreciate that changes may be made in the form of the invention covered by the following claims without departing from such principles. For example, the present invention could also be used to produce a non-uniform ammonia-to-$NO_x$ mole ratio distribution at the inlet of the SCR to compensate for non-uniform degradation of the catalyst within the SCR reactor catalyst bed. While the present invention may be applied to construction of original equipment fossil fuel boilers or combustors, it is particularly suitable for retrofit applications involving existing fossil fuel boilers or combustors, where design options may be limited. In some embodiments of the invention, certain features of the invention may sometimes be used to advantage without a corresponding use of the other features. Accordingly, all such changes and embodiments properly fall within the scope of the following claims.

We claim:

1. A flue having improved flow characteristics for use with a selective catalytic reduction reactor, comprising:
    a flue having an inlet end for receiving a gas flow and an outlet end for discharging the gas flow into a selective catalytic reduction reactor;
    vanes located within the flue upstream of the selective catalytic reduction reactor to divide the gas flow into two or more separate flow channels each channel having an inlet and an outlet; and
    means for supplying ammonia into the gas flow arranged within each flow channel.

2. The flue of claim 1, wherein the flow channels terminate proximate to the selective catalytic reduction reactor.

3. The flue of claim 1, wherein the means for supplying ammonia comprises an ammonia injection grid.

4. The flue of claim 1, further comprising conditioning means within at least one flow channel for conditioning the gas flow pattern.

5. The flue of claim 4, wherein the conditioning means comprises a perforated plate.

6. The flue of claim 4, wherein the conditioning means comprises one of flow straighteners, dampers, and combinations thereof.

7. The flue of claim 4, wherein the conditioning means comprises at least one static mixing tab.

8. The flue of claim 4, wherein the conditioning means comprises a straightening tube bundle adjacent the outlet end of the at least one channel.

9. The flue of claim 1, comprising gas flow rate measuring means within at least one flow channel for measuring the gas flow rate through the at least one flow channel.

10. The flue of claim 9, wherein the gas flow rate measuring means comprises a first pressure tap positioned adjacent the inlet end of the at least one channel and a second pressure tap positioned adjacent the outlet end of the at least one channel.

11. The flue of claim 9, comprising means for controlling the amount of ammonia provided to the at least one channel in response to the gas flow rate through the at least one flow channel.

12. The flue of claim 11, wherein the means for controlling the amount of ammonia provided to the at least one channel comprises a control valve.

13. The flue of claim 1, comprising means for controlling the gas flow rate through at least one flow channel.

14. The flue of claim 13, wherein the means for controlling the gas flow rate through at the least one flow channel is selected from one of a perforated plate, a damper, and combinations thereof.

15. A flue having improved flow characteristics for use with a selective catalytic reduction reactor, comprising:
- a flue having an inlet end for receiving a gas flow and an outlet end for discharging the gas flow into a selective catalytic reduction reactor;
- vanes located within the flue upstream of a selective catalytic reduction reactor to divide the gas flow into two or more separate flow channels each channel having an inlet end and an outlet end wherein the flow channels terminate proximate to the selective catalytic reduction reactor;
- means within each flow channel for supplying ammonia into the gas; and
- means within each flow channel for conditioning the gas flow pattern selected from at least one of a perforated plate, flow straighteners, dampers, a mixing tab, a rectifier grid and combinations thereof.

16. A flue having improved flow characteristics for use with a selective catalytic reduction reactor, comprising:
- a flue having an inlet end for receiving a gas flow and an outlet end for discharging the gas flow into a selective catalytic reduction reactor;
- vanes located within the flue upstream of a selective catalytic reduction reactor to divide the gas flow into two or more separate flow channels each channel having an inlet end and an outlet end wherein the flow channels terminate proximate to the selective catalytic reduction reactor,
- means within each flow channel for supplying ammonia into the gas;
- means within each flow channel for conditioning the gas flow pattern selected from at least one of a perforated plate, flow straighteners, dampers, a mixing tab, a rectifier grid and combinations thereof;
- gas flow rate measuring means within at least one flow channel for measuring the gas flow rate through the at least one flow channel; and
- means for controlling the gas flow rate through the at least one flow channel.

17. The flue of claim 16, comprising means for controlling the amount of ammonia in the at least one channel in response to the gas flow rate through the at least one flow channel.

* * * * *